United States Patent [19]

Takahashi et al.

[11] Patent Number: 5,086,415
[45] Date of Patent: Feb. 4, 1992

[54] METHOD FOR DETERMINING SOURCE REGION OF VOLCANIC TREMOR

[76] Inventors: Kozo Takahashi, 7-14-7 Takiyama, Higashi-Kurume-shi, Tokyo; Yukio Fujinawa, 6-5-1 Nakamura Minami, Tsuchiura-shi, Ibaraki-ken, both of Japan

[21] Appl. No.: 637,531

[22] Filed: Jan. 4, 1991

[30] Foreign Application Priority Data

Jan. 6, 1990 [JP] Japan .................................. 2-889

[51] Int. Cl.$^5$ .......................... G01V 1/00; G01S 3/80; G01S 3/808
[52] U.S. Cl. ................... 367/125; 367/129; 364/420; 364/421
[58] Field of Search ................ 367/13, 125, 127, 129; 181/122; 364/420, 421

[56] References Cited

U.S. PATENT DOCUMENTS

| 4,031,501 | 6/1977 | Caruso | 367/127 |
| 4,317,186 | 2/1982 | Nishi et al. | 367/127 |
| 4,480,322 | 10/1984 | Orieux et al. | 367/125 |
| 4,961,143 | 10/1990 | Takahashi et al. | 364/421 |

Primary Examiner—Ian J. Lobo
Attorney, Agent, or Firm—Oblon, Spivak, McClelland, Maier & Neustadt

[57] ABSTRACT

The source region of a volcanic tremor is determined by simultaneously detecting the tremor using seismometers installed at at least four separate points, obtaining correlation functions among pairs of the detected values, calculating at least three observation time lags corresponding to the maximal values of the correlation functions, and using the at least three observation time lags for determining the source region of the volcanic tremor.

2 Claims, 3 Drawing Sheets

METHOD FOR DETERMINING SOURCE REGION OF VOLCANIC TREMOR

BACKGROUND OF THE INVENTION

1. Field of the Invention

This invention relates to a method for determining the source region of a volcanic tremor caused by subterranean volcanic magma motion by measuring the volcanic tremor at at least four observation points.

2. Prior Art Statement

Similarly to the technique used in ordinary determination of the hypocenter of local earthquakes, the conventional technique for determining the source region of a volcanic tremor uses the difference in arrival time of P waves (longitudinal waves and compressional waves) and S waves (transverse waves and distortional waves) measured at at least four observation points or otherwise uses the times at which initial motion commences.

When the volcanic tremors are from a source region near the Earth's surface, however, it is frequently found that the P waves and S waves are not clearly distinguishable and, moreover, that the initial motion times cannot be accurately ascertained. Precise calculation of the tremor source region has therefore been difficult using the conventional hypocenter determination method.

Since this has made it impossible to obtain accurate knowledge regarding the source of volcanic tremors caused by magma motion even when the magma is near the surface (ordinarily within 20 km of the surface), it has been difficult to use volcanic tremor measurements for predicting volcanic eruptions accurately.

In U.S. Pat. No. 4,961,143 the inventors proposed a method for predicting volcanic eruptions comprising the steps of simultaneously receiving electromagnetic waves produced by magma via antennas installed at four points on land and/or the seabed, cross-correlating the received signals to detect time lags among the signals, calculating the size, magnitude and shape of the magma, which generates long-wave radiation, from the time lags, and predicting the likelihood of a volcanic eruption from time-course changes in the calculated size, magnitude and shape of the magma.

With this method, however, the fact that electromagnetic waves are attenuated by the Earth's crust makes difficult to conduct the required measurements when the magma is at a depth of 10 km or more from the surface. Another problem with the method is that its dependence on the reception of electromagnetic waves makes it necessary to use expensive observation equipment.

OBJECT AND SUMMARY OF THE INVENTION

The present invention was accomplished in the light of the foregoing situation and has as one of its objects the provision of a method for determining the source region of a volcanic tremor with high accuracy even when the volcanic tremor is produced by magma near the Earth's surface.

Another object of the invention is to provide such a method which enables an improvement in the accuracy of volcanic eruption predictions.

These objects of the invention are realized by a method comprising: detecting the waveform of one and the same volcanic tremor with seismometers at at least four observation points at the same time and recording the detected tremors and the time of detection in the form of signals; obtaining cross-correlation functions among the signals; calculating at least three independent observation time lags corresponding respectively to the maximal values of the cross-correlation functions; and determining the source region of the volcanic tremor on the basis of the three observation time lags.

Since the method according to the present invention does not have to distinguish between P waves and S waves and has no need for the initial motion commencement times, it is able to determine the source of a volcanic tremor irrespective of its depth. Moreover, since the method requires only the observation of vibrations it can be implemented using less expensive equipment than earlier methods requiring observation of electromagnetic waves.

The above and other features of the invention will become apparent from the following description made with reference to the drawings.

DESCRIPTION OF THE PREFERRED EMBODIMENT

Figure 1:
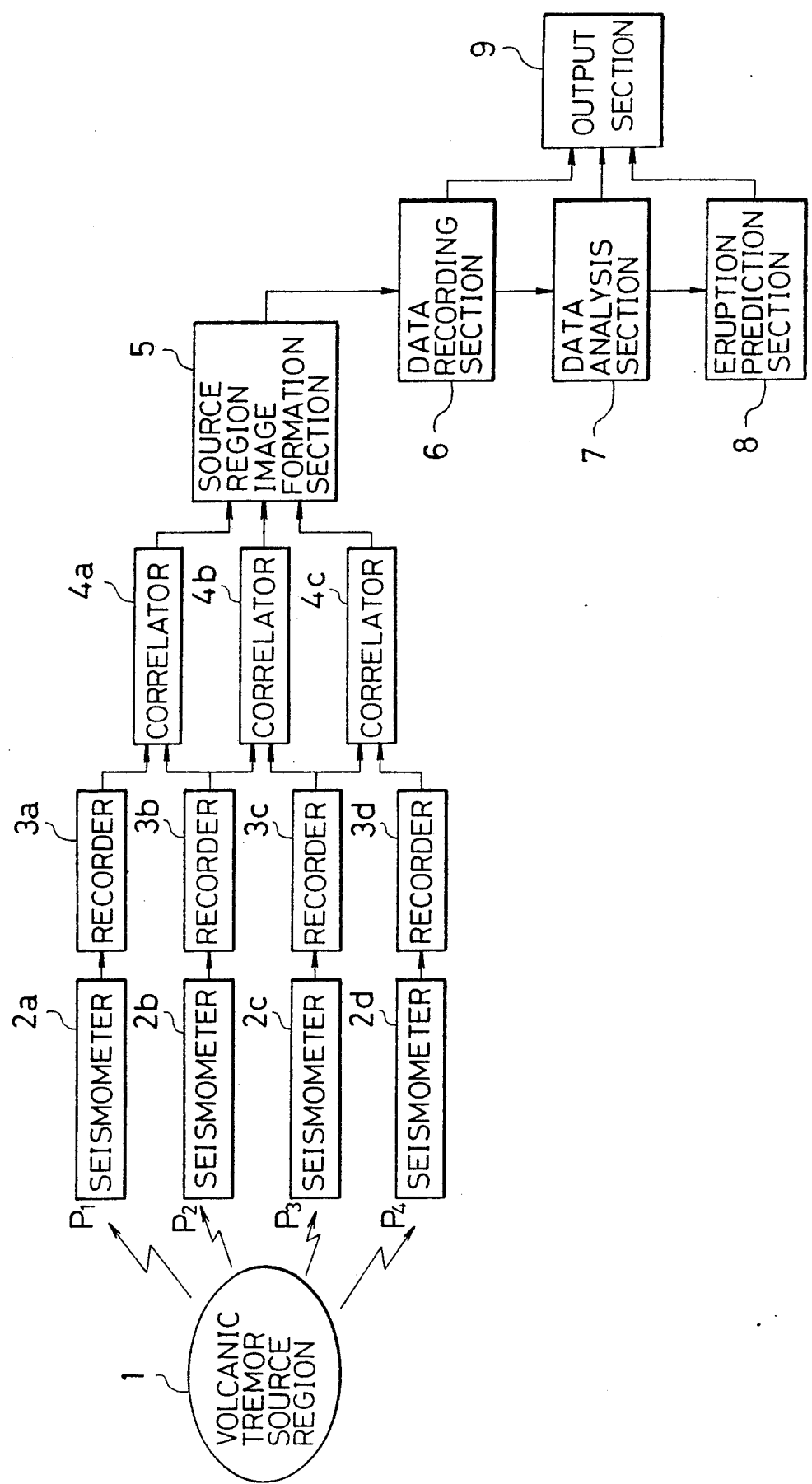
FIG. 1 is a block diagram illustrating the principle of the method for determining the source region of a volcanic tremor according to the invention.

The principle of the method for detecting the source region of a volcanic tremor in accordance with this invention is illustrated in FIG. 1, in which the reference numeral 1 denotes the source region of a volcanic tremor. Volcanic tremors accompanying the motion of magma are received by at least four seismometers $2a$, $2b$, $2c$, $2d$ installed at at least four observation points $P_1$, $P_2$, $P_3$, $P_4$ and converted to electric signals. The seismometers installed at the observation points may be of any type insofar as they have high sensitivity at least with respect to low frequencies. The observation points should preferably be separated from each other by at least around 10 km so that clearly ascertainable time lags will be obtained.

The signals output from the seismometers $2a$, $2b$, $2c$, $2d$ are sent to and recorded by recorders $3a$, $3b$, $3c$, $3d$. The signal recorded in the recorder $3a$ is forwarded to a correlator $4a$, the signal recorded in the recorder $3b$ is forwarded to the correlator $4a$ and a correlator $4b$, the signal recorded in the recorder $3c$ is forwarded to the correlator $4b$ and a correlator $4c$, and the signal recorded in the recorder $3d$ is forwarded to the correlator $4c$. As a result, a different signal pair is formed in each correlator. Each of the correlators $4a$, $4b$, $4c$ produces a cross-correlation function of the pair of signals input thereto and calculates the observation time difference (time lag) between the signals. The results are sent to a source region image formation section 5 which creates an image of the source region based on the time lag data it receives. The source region image formation section 5 outputs a signal corresponding to this image to a data recording section 6 where it is recorded. The data recorded by the data recording section 6 is forwarded to a data analysis section 7 which analyzes time-course changes in the size, position and change of the source region and forwards the data resulting from this analysis to an eruption detection section 8. The eruption detection section 8 outputs an eruption prediction upon detecting an abnormality in the data received from the data analysis section 7. The data from the data recording section 6, the data analysis section 7 and the eruption detection section 8 are forwarded to an output section 9 in which the input data are considered in total to output an eruption prediction.

The recorders, correlators, image formation section, data recording section, data analysis section, eruption prediction section and output section can, if desired, be constituted using a computer.

The method for calculating the cross-correlation functions between the signals corresponding to the volcanic tremor detected by the seismometers at the observation points and for calculating the time lags between the observation points will now be explained.

Figure 2A:
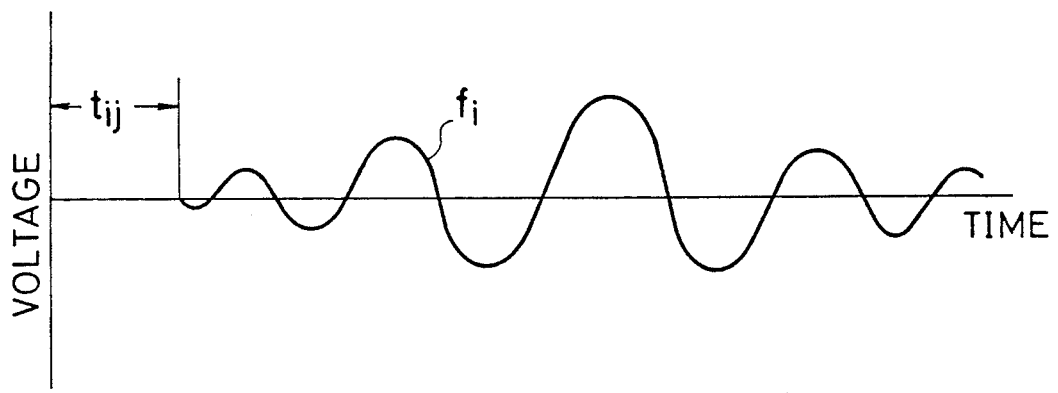
FIGS. 2(a) and 2(b) are waveform diagrams for explaining the time lag between the signals received by seismometers at two locations.
Figure 2B:
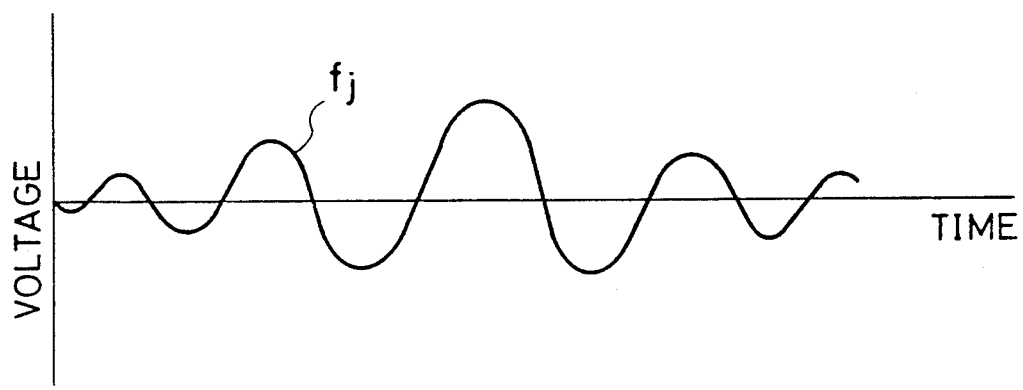

FIG. 2(a) shows the waveform fi(t) corresponding to a volcanic tremor detected at time t by the seismometer at observation points $P_1$ and FIG. 2(b) shows the waveform fj(t) corresponding to the same volcanic tremor detected at time t (with an error of not more than 10 ms) by the seismometer at observation point $P_2$.

The cross-correlation function $\gamma_{ij}(\tau)$ obtained from the two wave signals can be expressed as $$\gamma_{ij}(\tau) = \int_0^{T-\tau} f_i(t + \tau) f_j(t) dt \tag{1}$$

where T is the time at which the volcanic tremor was detected at observation points $P_1$ and $P_2$ and $\tau$ is the observation time difference (time lag).

The value $t_{ij}$ of $\tau$ at which $\gamma_{ij}$ of Eq. (1) becomes maximal is the time lag to be found. Specifically, the value $t_{ij}$ of $\tau$ satisfying the following Eqs. (1) and (2) is to be calculated $$\frac{d\gamma_{ij}(\tau)}{d\tau} = 0 \tag{2}$$

$$\frac{d^2\gamma_{ij}(\tau)}{d\tau^2} < 0 \tag{3}$$

In actual practice, $\tau = t_{ij}$ is calculated in the volcanic tremor source region image formation section 5 not by solving the Eqs. (1)–(3) but by graphically representing Eq. (1) and reading the value of corresponding to the maximal value of $\gamma_{ij}(\tau)$ with an error of not more than 10 ms.

Figure 3:
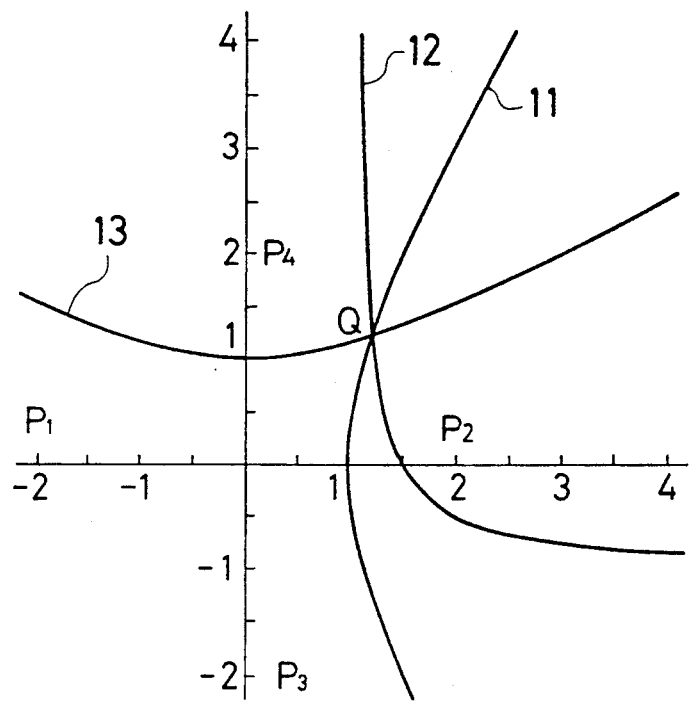
FIG. 3 is a graph showing how the source region of a volcanic tremor is determined by using signals received from four separately located seismographs to draw hyperboloids whose foci are the signal reception points.

If there are more than 4 observation points, the aforesaid method can be used to obtain three or more independent observation time differences for use in determining the source region of the volcanic tremor in the same manner that the differences among four or more observed earthquake initial motion commencement times are used as lag times for determining the hypocenter of an earthquake. More specifically, the observation time difference at which the cross-correlation function from the correlator 4a assumes maximal value is found and then, as shown in FIG. 3, a hyperboloid 11 having its foci at the observation points $P_1$, $P_2$ where the seismometers 2a, 2b are installed is drawn. Similarly, the time differences at which the cross-correlation functions from the correlators 4b, 4c assume maximal values are found and the hyperboloid 12 having its foci at observation points $P_2$, $P_3$ where the seismometers 2b, 2c are installed and the hyperboloid 13 having its foci at the observation points $P_3$, $P_4$ where the seismometers 2c, 2d are installed are drawn. The point of intersection Q of the three independent hyperboloids is taken as the source region of the tremor. In FIG. 3, $P_1$, $P_2$, $P_3$, $P_4$ are the observation points at which the seismometers are installed.

An explanation will now be given regarding the limits on cross-correlation function detection in the method for detecting the source region of a volcanic tremor according to this invention.

In the case where a volcanic tremor signal S originating from a wave source Q within the source region is detected by two seismographs at equal distances from the wave source, the correlation amplitude $\rho$ (which is equal to the correlation coefficient in the case where the detected value consists of a signal of a correlation coefficient of 1 and of a noise of a correlation coefficient of 0) can be expressed as $$\rho = \frac{S}{S + N} \tag{4}$$

where N is noise.

Because of limitations on the accuracy of the detected data, the number of independent data and the like, correlation detection is generally possible only when the following condition is satisfied:

$$\rho > 0.001 \tag{5}$$

Next the relationship between the size of the wave source and the cross-correlation will be explained.

Where the tremors (waves) from two wave sources Q, Q' within the volcanic tremor source region are defined as $\sin \alpha$ and $\sin (\alpha + \delta)$, the wave from the wave source Q' will contribute to the correlation of the wave from the wave source Q only in the case where the following equation is satisfied (the overline indicating the mean based on $\alpha$).

$$\overline{[\sin\alpha + \sin(\alpha + \delta)]^2} > \overline{\sin^2\alpha}$$

Solving this equation, there is obtained $$-\frac{2\pi}{3} < \delta < \frac{2\pi}{3}$$

where $\delta$ is the principal value.

This equation shows that even if the waves from two different wave sources are coherent in phase, they will constitute noise in the correlation output insofar as the phase difference between them is more than $2\pi/3$, i.e. insofar as the difference in propagation distance $\Delta l$ and the wavelength $\lambda$ do not satisfy the relationship of Eq. (6).

$$\Delta l < \frac{\lambda}{3} \tag{6}$$

The relationship between the directional difference (visual angle) and the propagation distance difference will now be explained.

Figure 4:
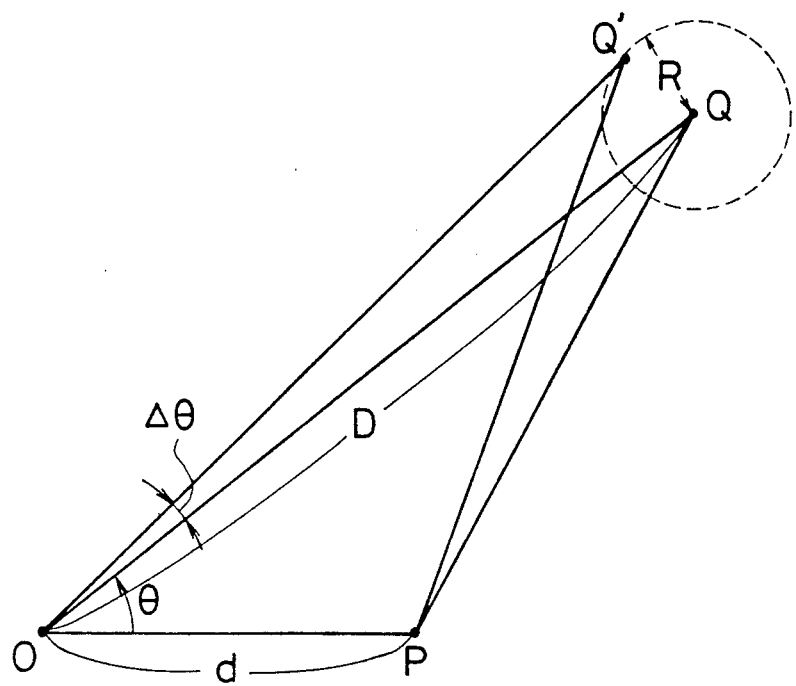
FIG. 4 is a graph showing the relationship between the visual angle of the wave source and the propagation distance difference.

In FIG. 4, O and P are observation points at which seismometers have been installed. Defining the direction of the wave source Q as seen from the observation point P as angle $\theta$ with respect to base line d connecting the observation points O, P and defining the direction of the wave source Q' slightly apart from the wave source Q from the same observation point P as the angle $\theta + \Delta\theta$ with respect to the same base line, the difference between the distance difference between OQ and PQ and the distance difference between OQ' and PQ' (defined as $\Delta$ and corresponding to the difference between the reception delay times) is approximately as shown by Eq. (7).

$$\Delta l \approx d \cos\theta - d \cos(\theta + \Delta\theta) \approx d \sin\theta \Delta\theta \qquad (7)$$

This equation shows that the detection of waves from two points Q, Q' differing in their $\theta$ directions by $\Delta\theta$ at two points O, P separated by distance d is the same as detection of the waves whose propagation distance difference is $\Delta l$. By substitution of Eqs. (6) for (7), $\Delta\theta$ is expressed by:

$$\Delta\theta < \frac{\lambda}{3d \sin\theta} \qquad (8)$$

Thus it is possible to determine the requirements that have to be met by $\Delta\theta$ and $\lambda$ for obtaining a correlation.

Next it will be explained why the method of this invention cannot be applied to seismic waves produced by ordinary fault motion.

In the case of an ordinary earthquake, the seismic wave is generally produced at a rupture front which moves within the fault plane at a rupture velocity of 2−5 km/s, meaning that the source region of the seismic wave moves within the source region with the passage of time. In this case, the distance between the wave source and the observation points changes from instant to instant within the integrated time T of Eq. (1). As this means that the lag time corresponding to the difference in distance also changes from instant to instant, it becomes meaningless to calculate the lag time $\tau$ from the maximal value. Moreover, the length of the fault plane, which may reach more than several tens of km, is ordinarily longer than the wavelength of the main component of a seismic wave (normally 40 m−4 km). Therefore it becomes impossible to satisfy Eqs. (6) and (8) and, in addition, most of the waves come from regions that do not satisfy these equations. Since it is as a result difficult to satisfy Eq. (5), Eq. (1) is not likely to have a pronounced maximal value. It is for these reasons that conventional techniques are ordinarily limited to determination of the location of the origin of the initial seismic wave, namely the hypocenter.

Differently from ordinary earthquakes, the volcanic tremors to which the present invention is directed are tremors produced by the motion of subterranean magma and the velocity of this movement is low. As a result, the amount of motion of a volcanic tremor source region during the integrated time T (normally several seconds) is smaller than the wavelength of the main component of the volcanic tremor (100 m−10 km). In such a case, Eq. (1) has a maximal value and functions to determine the lag time $\tau$ (the differences in the time it takes for the volcanic tremor to propagate from the source region to the observation points) corresponding to the maximal value.

An explanation will now be made with respect to the relationship between the size of the volcanic tremor source region and the possibility of obtaining a correlation function.

Assuming the velocity of a volcanic tremor to be, say, 4.5 km/s and its frequency to be 1 Hz, the wavelength becomes $$\lambda = \frac{4.5 \text{ km/s}}{1 \text{ Hz}} = 4.5 \text{ km} \qquad (9)$$

Substituting this value into Eq. (6), there is obtained $$\Delta l < 1.5 \text{ km} \qquad (10)$$

and assuming $$d \sin\theta = 100 \text{ km} \qquad (11)$$

Eq. (8) gives $$\Delta\theta < 0.015 \qquad (12)$$

In FIG. 4, defining the distance between observation point O and wave source Q as D and the radius of the wave source as seen from observation point O as R, it will be possible to obtain a correlation function from waves within visual angles satisfying Eq. (13) below. (In a case where Eq. (12) is satisfied, the tremor is deemed to be from the source region.)

The radius R of the wave source being as indicated by Eq. (13), if the distance from the observation point O to the wave source Q is assumed to be 100 km, then substitution of Eq. (12) into Eq. (13) results in R < 0.75 km.

$$R = \frac{D \tan \Delta\theta}{2} \qquad (13)$$

Since the fact that R is not greater than 0.75 km also satisfies Eq. (10), it can be concluded that a wave source with a diameter of 1.5 km is completely adequate for enabling a correlation function to be obtained. In other words, if the magma and volcanic tremor source are in the same region and the diameter of the magma is about 1.5 km, a tremor from the magma will be deemed as being S in Eq. (4). This fact, together with Eq. (5), means that the method of the present invention is capable of effectively detecting the source region of a volcanic tremor with respect to magma within a region of a diameter of up to 15 km.

It is well known that the motion of the subterranean magma of a volcano generates volcanic tremors. Thus the ability to determine the source region of volcanic tremors with high accuracy can be expected to enable accurate prediction of volcanic eruptions. Although conventional techniques may be capable of accurately determining the source region of tremors caused by magma located far below the Earth's surface, it has been difficult to use them for accurately determining the source region of volcanic tremors caused by the motion of magma located near the surface. In contrast, since the method of the present invention makes it possible to determine the source region of volcanic tremors caused by the motion of magma near the surface, it can be expected to dramatically increase the accuracy of volcanic eruption prediction based on the motion of magma near the surface.

What is claimed is:

1. A method for determining a source region of a volcanic tremor, comprising the steps of:

detecting a volcanic tremor with seismometers at at least four observation points at the same time and recording the detected tremor from each seismometer in the form of a signal;

obtaining at least three cross-correlation functions among pairs of the recorded signals of the tremors detected at the observation points;

calculating at least three observation time lags at which the respective correlation functions become maximal; and determining the source region of the volcanic tremor from the maxima of the at least three cross-correlation functions which directly correspond to the at least three observation time lags.

2. A method according to claim 1, wherein:

the seismometers are separated from one another by more than about 10 kilometers.

* * * * *

UNITED STATES PATENT AND TRADEMARK OFFICE
CERTIFICATE OF CORRECTION

PATENT NO. : 5,086,415

DATED : February 4, 1992

INVENTOR(S) : Kozo Takahashi et al.

It is certified that error appears in the above-identified patent and that said Letters Patent is hereby corrected as shown below:

On the title page:
The Assignees have been omitted, should be, --COMMUNICATIONS RESEARCH LABORATORY, MINISTRY OF POSTS AND TELECOMMUNICATIONS, Tokyo; NATIONAL RESEARCH INSTITUTE FOR EARTH SCIENCE AND DISASTER PREVENTION, SCIENCE AND TECHNOLOGY AGENCY, Tsukuba, both of JAPAN--.

Signed and Sealed this

Twenty-first Day of September, 1993

*Attest:*

BRUCE LEHMAN

*Attesting Officer*  *Commissioner of Patents and Trademarks*